United States Patent
Wong

Patent Number: 5,858,158
Date of Patent: Jan. 12, 1999

[54] ELECTROMAGNETIC DISK AND METHOD OF MAKING

[75] Inventor: Coeman L. S. Wong, Scarborough, Canada

[73] Assignee: Mark IV Industries Limited, Mississauga, Canada

[21] Appl. No.: 102,512

[22] Filed: Aug. 5, 1993

Related U.S. Application Data

[63] Continuation of Ser. No. 849,539, Mar. 11, 1992, abandoned.

[51] Int. Cl.$^6$ ...................................................... B32B 31/00
[52] U.S. Cl. ........................ 156/252; 156/293; 156/303.1; 156/324
[58] Field of Search ..................................... 156/252, 253, 156/303.1, 293, 324; 210/426, 449; 340/764

[56] References Cited

U.S. PATENT DOCUMENTS

| | | |
|---|---|---|
| 3,031,960 | 5/1962 | Bishop . |
| 3,140,553 | 7/1964 | Taylor . |
| 3,365,824 | 1/1968 | Winrow . |
| 3,469,258 | 9/1969 | Winrow . |
| 3,518,664 | 6/1970 | Taylor ..................................... 340/764 |
| 3,624,941 | 12/1971 | Chantry ..................................... 40/449 |
| 3,847,700 | 11/1974 | Dalal et al. .............................. 156/252 |
| 3,871,945 | 3/1975 | Winrow et al. . |
| 3,953,274 | 4/1976 | Winrow et al. . |
| 4,577,427 | 3/1986 | Browne . |
| 4,595,440 | 6/1986 | Lynch . |
| 5,055,155 | 10/1991 | Crotty et al. ............................. 156/519 |
| 5,073,221 | 12/1991 | Waits et al. . |

*Primary Examiner*—Merrick Dixon
*Attorney, Agent, or Firm*—Robert L. Westell

[57] ABSTRACT

A magnetic disk to selectively display opposite colored sides is constructed by providing upper, lower and middle tape layers. The middle layer is punched to provide a series of magnet receptacles when the upper and lower layers are added. The lower layer is added to the middle layer and the magnet inserted. The upper layer is applied and the magnet is magnetized before individual disk elements are detached from the tape. The upper layer may be constructed from a plurality of sub layers. The sub layers may be combined in a separate step before the upper layer is applied to the middle. The upper tape may be applied to the middle by pressure sensitive adhesive. The upper tape sub layers may be an outer clear layer and an inner colored layer, which clear layer may be treated for ultra violet filtering and to provide a matte finish. The sub layers in said upper layer may use a sub layer next to the middle layer which has a low linear coefficient of thermal expansion and preferably one similar to that of the lower layer. An upper sub layer when below a clear layer may be colored and translucent with a reflecting surface between the translucent sub layer and the middle layer. Such sub layers may include a fluorescent or retroflectant, or both. Disk produced by the process may be installed on a mount and have its dark side sprayed with a conducting coating.

9 Claims, 2 Drawing Sheets

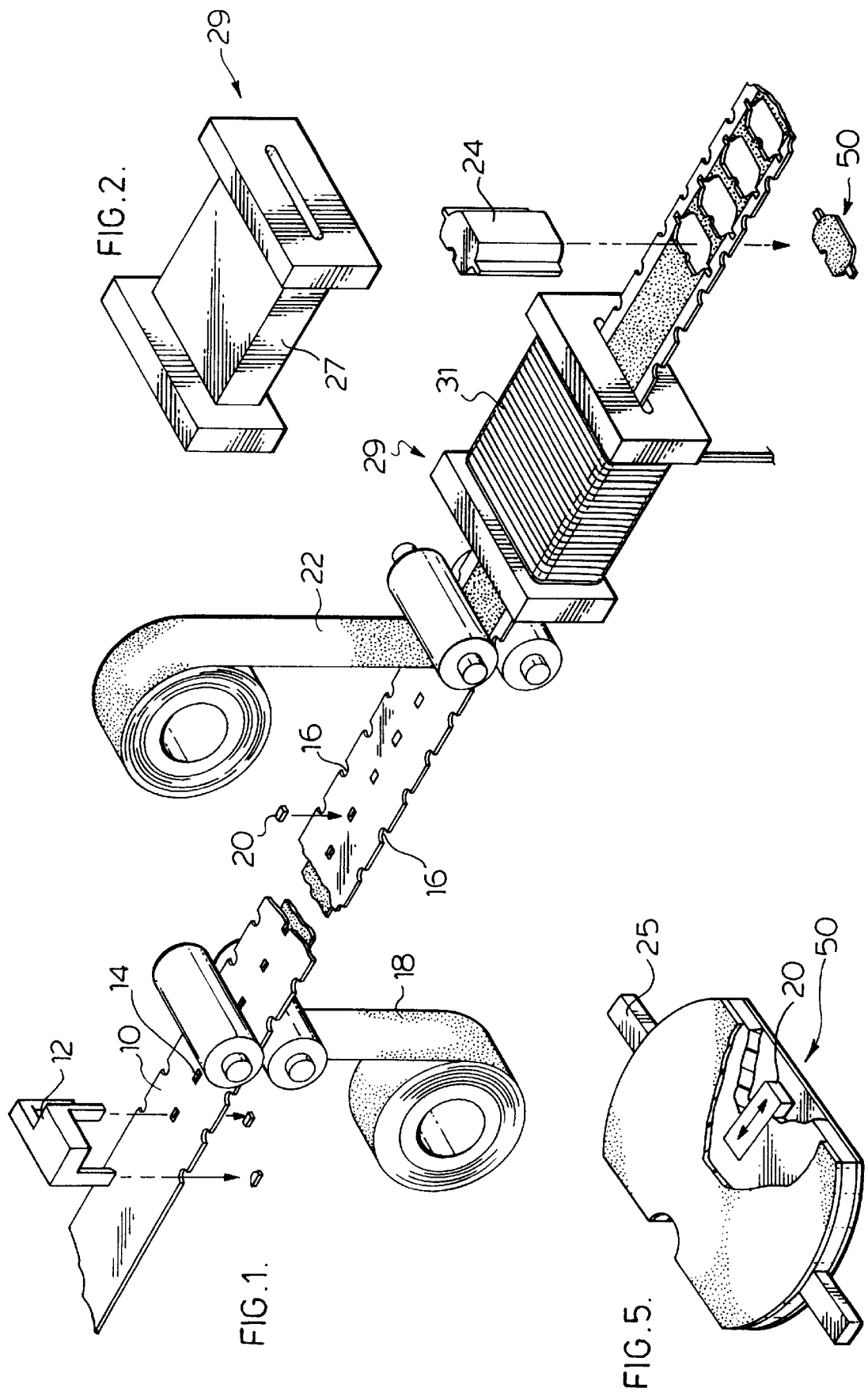

ELECTROMAGNETIC DISK AND METHOD OF MAKING

This application is a continuation of application Ser. No. 07/849,539, filed Mar. 11, 1992 now abandoned.

This invention relates to a method of making disks for operation in display or indicating elements and to the disks and the associated element using such disks.

By 'disk' herein is meant a generally flat element defining a median plane and rotatable about an axis, at least approximately, in the plane of the disk to display one or the other side in a viewing direction. The sides are in some way visually contrasting, usually dark and light and the light side for certain uses may be fluorescent or retroreflective or both.

In the commonly owned U.S. Pat. Nos. 3,871,945 dated Mar. 18, 1975 and 3,953,274 dated Apr. 27, 1976, whose teaching is incorporated herein by reference, there is described the method of construction of such disks from three laminated layers of tape the centre one of which is apertured to receive the permanent magnet required.

The terms 'layers' and 'tapes' are synonymous herein in the sense that, in the methods described herein, three 'tapes' are laminated to become layers. Thus two sub-layers may make what is initially a tape and later a layer.

Similar disks are briefly referred to in commonly owned U.S. Pat. No. 4,577,427 dated Mar. 25, 1986 for the electromagnetic drive for such disks. The present invention relates to improvements in the methods of making disks, and the disks thus produced. The nature of the improvements will be described in detail hereafter.

In the disks produced in accord with this invention the central tape or layer provides the stiffness for the disk and the aperture for housing the magnet. The two outer tapes provide the contrasting colors and also act to retain the magnet in its aperture.

In one aspect of the inventive method the permanent magnets are magnetized in the desired polarity before removal of individual disks from the three laminated layers of tape. A great saving in the handling of individual disks is thereby achieved and errors of magnetizing polarity are avoided. In accord with the inventive method the middle and two outer tapes are caused to travel in the longitudinal direction of the tapes between the location where the lamination process is complete and the location where individual disks are separated from the tape. Between these locations a magnetizing winding is provided, shaped to define a slot for the longitudinal travel of the tape. The coil is arranged to provide magnetization and polarization in the selected sense, in the longitudinal travel direction of the tape. Thus the method is used with disks whose magnets are to be polarized in the longitudinal direction of the tape and this implies that the disk rotation axis will be substantially in the plane of the tape and transverse to the tape travel direction. Usually the spindles will be formed as integral parts of the central layer, in this application, extending from the disk proper shape transverse to the travel direction. Thus the central layer provides the stiffness or 'backbone' of the disk. In accord with a preferred aspect of the magnetizing method the middle and lower tapes are stepped forwardly which is an incident of the magnet insertion step. The longer dimension of magnet and its aperture is in the tape-laminate travel direction. The upper is then added and three-layer laminate follows such stepping advance. During the presence of individual magnets within the three layer laminate within the sleeve winding, the winding is pulsed to achieve the correct magnetization. In this way all disk magnets are provided with a known magnetization, relative to the disk orientation without the necessity of any handling or opportunity for error. In the preferred form of the invention the length of the winding sleeve corresponds to the intervals for several magnets or 'steps' in the advancing tape. At each step the winding is pulsed so that each magnet receives its desired polarity magnetization by a plurality of pulses, this being found a consistent way of achieving the correct magnetization.

In another aspect of the invention the three layer tape laminate is designed to provide a bright side and a dark side, the terms 'bright' and 'dark' being used to designate the corresponding layers. In accord with one aspect of the invention it is preferred to provide that the bright side outer layer is a lamination of sub layers comprising (in this aspect) a colored, (usually vinyl) sub-layer tape with a protective clear transparent covering layer. The two (or three) sub layers forming the outer layer are laminated together (in accord with the invention) to form an outer tape prior to their lamination as a unit to the middle layer. The use of the colored tape provides a convenient and economical way to select a range of colors sometimes also having specialized qualities such as fluorescence or retroreflectivity since tapes used as sub layers herein are commercially available with these qualities. The clear sub layer covering protects the colored sub layer tape from soiling or, scuffing and may act to protect the colored tape from the full effects of temperature fluctuation which, in some applications, may be between $-50°$ C. and $50°$ C. The clear sub-layer (frequently polyvinyl fluoride 'PVF') may also be provided with an ultra violet filtering ingredient and, may be provided with an ingredient to simulate a 'matte' finish, that is to reduce unwanted surface reflectivity and highlights in the colored top.

At times the outer layers are referred to as 'upper' and 'lower' layers. This is for convenience only and the 'upper' layer may at times be physically the lower, and vice versa.

In a preferred aspect of the invention the 'bright' outer layer comprises an outer clear sub layer, as before described, overlying a translucent sub layer, which contributes the color selection and the fluoresceny to the 'bright' side of the lamination. In view of the translucency of the inner sub layer, a light, (preferably white) outwardly facing reflecting surface is provided immediately below the translucent sub layer. Preferably this is provided by a white PVF tape forming the innermost sub layer of the 'bright' outer tape. Instead of the reflecting sub layer, there may also be provided an outwardly facing reflectant white coating on the inner side of the translucent sub layer or, if available, a reflectant adhesive between the bright and the middle layer.

In a preferred form of the invention, the middle layer is the stiffest portion of the disk and sustains its shape and, where the spindles are part of the middle layer, forms the structural connection between each spindle, the disk portion, and the other spindle. In this aspect warpage of the middle layer is avoided over a wide range of temperatures which may be $-50°$ to $50°$ C. by providing that the outer layer (or a sub layer of one outer layer immediately adjacent the middle layer) has substantially the same coefficient of linear thermal expansion as the immediately adjacent layer or sub layer of the other outer layer. Thus, (and using the preferred embodiment as an example) the dark side outer layer is preferably PVF as is the sub layer of the bright side outer layer nearest the middle layer.

The inner sub layer of the bright side outer layer is therefore also selected to be PVF so that 'warpage' influences with temperature changes are substantially identical on each side of the middle layer and substantially no warpage takes place.

In accord with a further aspect of the invention it is desired to treat the disk, in accord with the invention, to reduce the collection of static charge. The collection of static charge is a characteristic of the disks and a sufficient accumulation of such charge may cause the disk to stick. Accordingly it would be desireable to provide a conducting coating on the outside disk surfaces. This is difficult to do with the bright side because the coating would impair the brightness. However, in accord with this aspect of the invention, the outer surface of the dark side layer is sprayed with a conducting graphite coating which incidentally reinforces the dark appearance of the disk. The conducting graphite coating allows accumulated static change to flow over the dark surface of the disk. Where the disk mount provides a metal stop which contacts the dark disk surface the static charges on this surface may be substantially dissipated. Where the charge is not dissipated, the conducting coating assists the charge to equalize over the disk surface which reduces the chance of sticking due to the effect of a charge accumulation. It is not found advantageous to spray the dark side of the three layer lamination before detachment of the disks because the conducting coating is fragile and tends to become damaged when the disk is handled. It is therefore preferred to detach the individual disks resulting from the process and install them in their element mounts dark side up. The dark sides of the disks are then sprayed with the conducting coating. Such spraying will also coat the adjacent surfaces of the mount. However these are also typically dark and to some extent the equalization of static change thereon will also reduce the likelihood of sticking of the disk.

In drawings which illustrate preferred embodiments of the invention:

FIG. 1 shows, schematically, the mode of manufacturing the disks,

FIG. 2 is a view of the magnetizing core bobbin with the winding removed,

FIG. 5 shows a broken away view of a disk.

Figure 4:
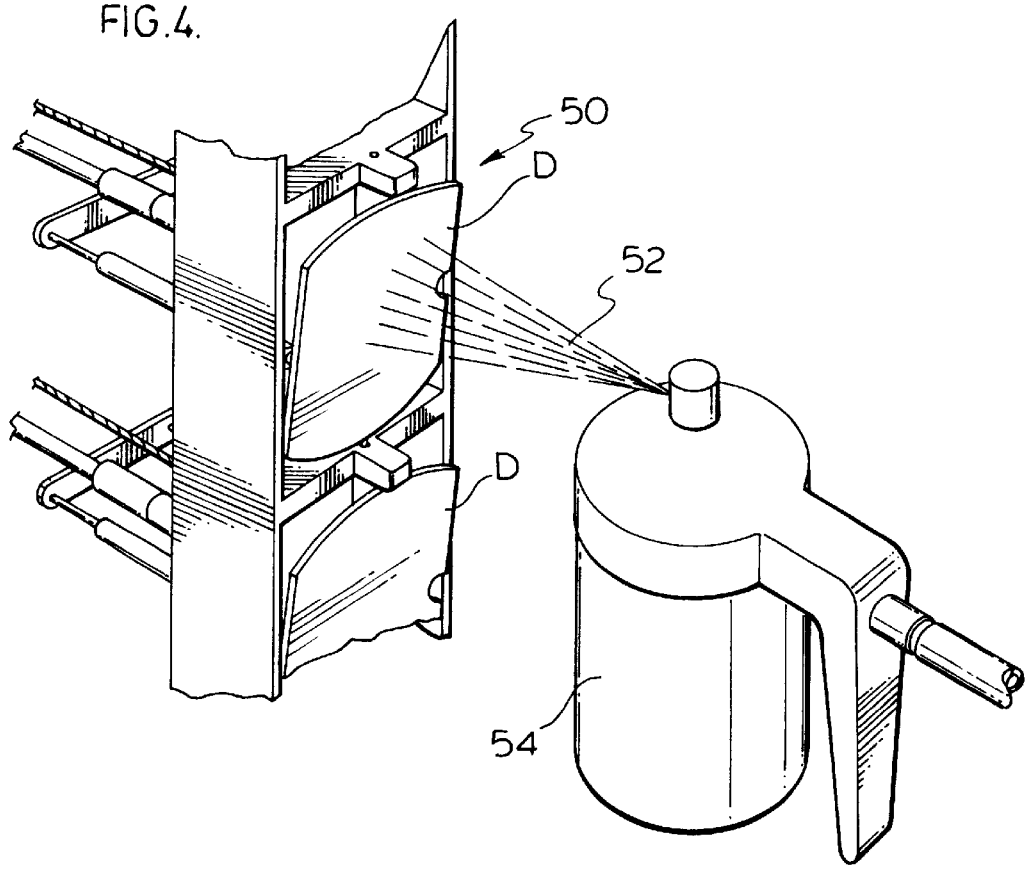
FIG. 4 shows a plurality of disks mounted dark side up being sprayed in accord with the invention.

In FIG. 1 is shown the features of the disk manufacturing process. Most of these are in accord with the teachings of U.S. Pat. Nos. 3,871,945 and 3,953,274 previously referred to which are incorporated herein by reference. In accord with the teachings of those patents, a central layer 10 of tape, usually mylar, is stamped by schematically shown means 12 to provide magnet apertures 14 to fit the dimensions of the magnet to be used and notches (or apertures) 16 near the edge or edges of the tape for indexing purposes. The long dimension of apertures 14 is preferably parallel to the tape direction. The lower outer tape 18 is applied to the middle tape with suitable adhesives to form a two layer laminate. The magnets 20 preferably of cunife are then placed in apertures 14 without concern for their initial magnetization. The long dimension of magnets 20 corresponds to that of aperture 14 and is preferably parallel to the tape travel direction. The travel of the tapes and two and three layer laminates is preferably intermittent with stops as determined by the indexing notches 16 to allow the insertion of the magnets 20. It will be noted that the longitudinal dimension of the magnets is preferably parallel to the direction of tape travel. As noted in the reference patents the thickness of the magnets is preferably that of the middle layer. Thereafter the upper layer 22 of tape is applied to form a three layer laminate. The disk shape will be stamped out (or outlined in weakened lines) at stamp 24. The shape of the disk and magnet location may vary. Thus the disk may be oval with an eccentrically located magnet as shown herein and in co-owned U.S. Pat. No. 4,577,427 dated Mar. 25, 1986, round with a symmetrically located magnet as shown in U.S. Pat. Nos. 3,781,945 and 3,953,274 or a number of other variants of disk shape or magnet location. However the magnet axis will for the preferred method of magnetization be parallel to the longitudinal travel direction. The disk spindles 25, stamped to be integral extensions of the central layer will be perpendicular to the direction of tape travel.

Between the application of the upper outer tape and the stamping step the three layer laminate is caused to pass through a correspondingly shaped sleeve 27 of a plastic bobbin 29. A winding 31 is provided on the bobbin sleeve 27 to surround the tape with turns wound transverse to the tape, in the desired sense, given the energization, to produce the desired magnetic polarity in the magnet. FIG. 2 shows the bobbin 29 and sleeve 27 with the winding absent. It will be noted that the length of the winding 31 is preferably about four times the distance between magnets 20. With each step of the three layer laminate a magnetizing pulse is sent to the winding, from an electrical source, not shown. Thus in accord with the preferred method of magnetization each magnet 20 receives a plurality of magnetization pulses during its passage through the winding to produce the magnetization desired.

It will be seen that magnetization at this stage with the character of the tape sides already determined by the colors of the two outer layer outer surfaces produces a consistent magnetic polarization without the requirement of handling or the possibility of errors.

It is now desired to discuss the constituents of the tapes which become layers.

It will be noted that although a disk may have visually contrasting 'bright' sides, most applications of the invention use a bright and a dark side. The provision of sub layers in the bright side tape is discussed as if there were only one bright side. However the sub layers discussed are equally applicable to a second 'bright' side tape.

Thus the commonest disk has a middle layer M which is stiffer than the other two layers, the 'backbone' of the disk and structually determines its shape and the structural connection of the two spindles. It is preferred to use mylar of the thickness of the magnet.

As the dark outer layer it is preferred to use black polyvinyl fluoride ('PVF') D manufactured by Du Pont Canada Inc. of 7070 Mississauga Rd., Mississauga, Ont. Canada and sold under the trade mark TEDLAR.

Given the middle dark outer layers, the bright outer layer will now be discussed.

FIGS. 3A–3E are partial sectional views of three layer laminates. They might also be considered as partial sectional views of disks made from the corresponding three layer laminates.

Figure 3A:
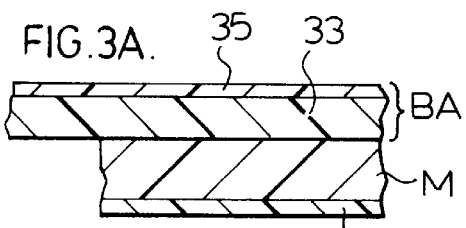
FIGS. 3A–3E show sections of the three layer laminate transverse to its plane in accord with preferred embodiments of its invention.

In FIG. 3A the bright outer layer BA is shown having an inner sub layer 33 of brighter colored vinyl and in outer sub layer of clear plastic 35, preferably PVF. The vinyl 33 is subject to scuffing and soiling and the clear layer 35 provides protection in this regard. The vinyl 33 has a relatively high coefficient of linear thermal expansion and the clear covering provides a small protection against ambient temperatures and expansion and shrinkage. Disadvantages of this arrangement are discussed hereafter.

In accord with another aspect of the invention, the sub layers X, Y of a bright layer BB are combined so that the bright outer layer BB is a unit before application (as the upper or lower outer layer) to the middle tape. This is demonstrated in FIG. 6 where the two sub layers X and Y, provided with a coating of transparent pressure sensitive adhesive, are combined to provide the outer bright layer BB in a separate operation allowing layer BB to be performed at a separate location. As FIG. 6 demonstrates, a third sub layer Z may be similarly applied to form part of the outer bright layer.

The vinyl layer 33 is subject to fading with time under ultra violet light. In accord with techniques well known to those who provide PVF tape, it is possible to provide in the mix for this tape, an ingredient which acts as an ultra violet stop filter. It would be also possible to provide a thin extra sub layer of otherwise transparent ultra violet filtering tape.

The reflection of highlights from the PVF sub layer can be a distraction to the viewer and interfere with visual efficiency of the disk. It is also known to provide the mix for the PVF sub layer 35 with an ingredient which provides the effect of a matte finish and reduces the highlights.

Figure 3B:
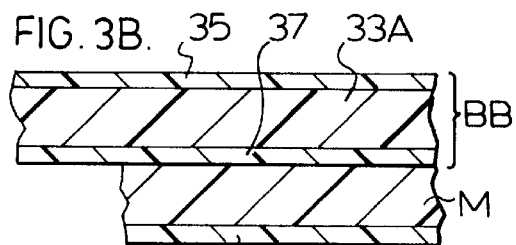

It is often desired that the bright side of the disk or three layer laminate be fluorescent as well as colored or bright. It is not presently practical to obtain a combination of non-fluorescent color and fluorescent material in vinyl tape. If fluorescent material only is used this fades with time and in the absence of other coloring becomes white when faded. For this reason it is sometimes desireable as shown in FIG. 3B to replace the vinyl sub layer 33 with a translucent layer 33A of a polycarbonate sold by General Electric Canada Inc. 2300 Meadowvale Blvd., Mississauga, Ont. Canada under the trade mark LEXAN. This product has the advantage that both non-fluorescent and fluorescent ingredients may be included in the mix so that when the fluorescent fades, the disk still has the desired color appearance. However, because the polycarbonate is translucent, a light, preferably white outwardly facing sub layer or coating must be provided between the polycarbonate layer and the middle layer. It is preferred to provide an inner sub layer 37 (of the bright outer layer) of white PVF to form the outer layer BB having sub layers 37, 33A, 35 going outward. The PVF sub layer 37 has another advantage as now discussed.

It should first be noted that the inner surface of the inner sub layer of layer BB will be in adhesive contact with layer M. Layer M will also be in adhesive contact with the inner surface of layer D.

With the clear then vinyl sub layers 35, 33 as discussed in connection with FIG. 3A the differential linear thermal expansion coefficients of the vinyl bright sub layer 33 and the dark layer D PVF tends to cause warpage of the middle mylar layer and hence of the disk. Thus it is preferred to provide that the layers or sub layers adjacent the middle (mylar) layer M on each side have substantially the same coefficient of linear thermal expansion to avoid such warpage. The preferred method of achieving this is demonstrated in FIG. 3D where the clear and vinyl sub layers 35 and 33 are provided with an inner sub layer 37 of PVF for prior attachment as layer BD to the other sub layers in the manner shown in FIG. 6. In the embodiment of FIG. 3B with the translucent polycarbonate layer, the bright side sub layer of PVF also acts to prevent warpage.

Figure 3C:
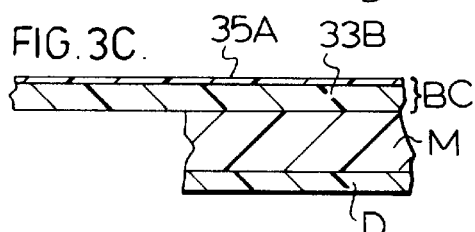
Figure 3D:
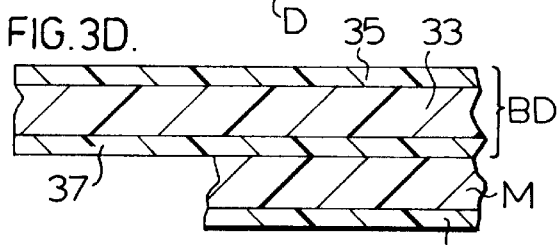
Figure 3E:
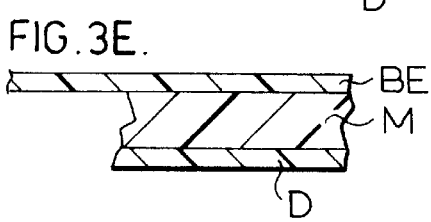

It will be noted that a simple disk could be provided with a bright PVF layer BE, a layer M of mylar and a dark PVF layer D as shown in FIG. 3E. This is not however found economical if a large number of bright side colors are required. Such versatility is more economically provided by the vinyl or polycarbonate sub layers described.

If a retroreflective bright side is desired, this may be provided by the arrangement of sub layers shown in FIG. 3C where retroreflective tape 33B is shown. A clear PVF layer 35A may be provided over the retroreflective tape 33B unless it comes with its own protective layer. The retroreflective tape 33B may be one of a number of known types including those with glass heads and those with cube corner reflectors. If because of the thermal coefficient of the retroreflectant material warpage becomes a problem, a PVF sub layer may be provided on the inner side of the retroreflectant sub layer.

Figure 6:
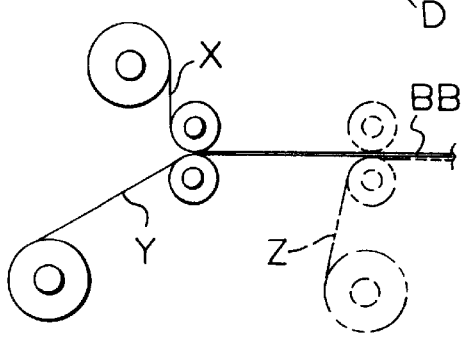
FIG. 6 is a schematic view showing the combination of sub layers to form an outer tape or layer.

With reference to FIGS. 3A and 3C the layers BA or BC may be provided using the correct sub layers where indicated for X and Y in FIG. 6 and referring to FIGS. 3B and 3D the correct sub layers may be used as indicated by X, Y and Z in FIG. 6.

FIG. 4 demonstrates the method of providing a conducting coating to the dark side D of the disk. The disk produced as shown in FIG. 1 is applied to its pivoted mount, for example the strip module of FIG. 4 (fully described in U.S. Pat. No. 4,577,427 incorporated herein by reference). The disk 50 is flexed for insertion in the pivot apertures. The disks 50 are all oriented dark side D up. The dark sides D are then sprayed with a spray 52 in any conventional manner shown schematically as can 54 which is preferably a mixture of graphite pigment and polyvinyl chloride PVC in solution form with a methyl ethyl ketone diluent. The spray material is obtainable from Acheson Colloids Canada Limited, P.O. Box 665, Brantford, Ontario N3T 5P9 under the trade mark ELECTRODAG 109. It is preferably provided to a coating thickness of about 0.002" maximum and produces, at ambient room temperature a resistance of 100–5000 ohms/square (measured by parallel equal length contacts spaced by a distance equal to their lengths). Static accumulation on the disks, tending to cause hangups is thus reduced. The spraying process results in some coating to the adjacent mounts for the disks. The resultant reduction of static accumulation on the mounts is also a benefit and may tend to reduce hangups. The same procedure is used with other mounts than that shown.

In relation to the coefficient of linear thermal expansion, approximate values for materials discussed herein are:

| | |
|---|---|
| vinyl | $4 \times 10^{-4}$ in/in/°C. |
| tedlar | $8.1 \times 10^{-5}$ in/in/°C. |
| mylar | $1.7 \times 10^{-5}$ in/in/°C. |
| polycarbonate | $6.7 \times 10^{-5}$ in/in/°C. |

To avoid warping of the mylar central layer M under wide ranges of temperature fluctuation we prefer that the difference in thermal coefficients between the layers or sub layers contacting layer M on opposite sides be less than $2 \times 10^{-5}$ in/in/°C. Where the term 'low thermal coefficient' or 'low thermal coefficient of expansion' or 'coefficient of thermal expansion' used herein is meant material having a coefficient of linear thermal expansion less than $1 \times 10^{-4}$ in/in/°C.

I claim:

1. In the method of construction of a plurality of laminar magnet-bearing elements, the steps of:

providing a middle tape, creating a plurality of magnet apertures in said tape, said magnet apertures longitudinally spaced along said tape having, in plan, a longer dimension in the strip travel direction, each of said apertures being spaced from at least one edge of said tape, creating indexing cut-outs in said tape nearer to said at least one edge than said magnet apertures, after the creation of said apertures causing a first outer tape to adhere to one side of said middle tape, covering said apertures on said one side, thereafter placing magnets in said apertures, said magnets being selected and oriented to have their longitudinal axis approximately parallel to said tape and thickness approximately that of the middle tape, thereafter, causing a second outer tape to adhere to the other side of said middle tape overlying said magnets and magnet aperture and leaving exposed on said other side, at least a portion of said cut-outs, including the step of forming one of said outer tapes from at least two sub layers prior to causing said last mentioned outer tape to adhere to said middle tape, wherein said at least two sub layers include: a coloured sub layer and an outer superimposed clear sub layer with a linear thermal coefficient lower than that of said coloured sub layer, where the said one of said outer tapes is combined with said middle tape with the coloured sub layer of said outer tape nearer said middle tape, said coloured sub layer having at least one coloured side which faces said clear sub layer.

2. In the method as claimed in claim 1 including the step of providing an ultra violet filtering agent exterior to said colored layer.

3. In the method as claimed in claim 1 including the step of providing an agent in said clear layer to produce a matte finish.

4. In the method of constructing a plurality of laminar magnet-bearing elements, the steps of:

providing a middle tape, creating a plurality of magnet apertures in said tape, said magnet apertures being longitudinally spaced along said tape having, in plan a longer dimension in the strip travel direction, longitudinally spaced, along said tape, each of said apertures being located more than a predetermined distance from at least one edge of said tape, after the creation of such apertures causing first outer tape to adhere to one side of said middle tape, covering said apertures on said one side, thereafter placing magnets in said apertures, said magnets being selected and oriented to have an axis of magnetization with a component in the plane of the tape and a thickness approximately that of the middle tape, thereafter, causing second outer tape to adhere to the other side of said middle tape overlying said magnets and magnet apertures, wherein the respective outer surface of said cohering three tape layers comprise a light and a dark outer surface, including the step of deriving from said cohering layers a rotatable display or indicating disk including one of said magnets, installing said disk in pivotal relationship to a mount, and spraying the dark side of said installed disk with a conducting graphite coating.

5. A magnetically rotatable element of relatively wide relatively thin substantially planar shape, whose thickness is made up of a middle and two outer layers of tape, an aperture in said middle layer of tape located to be covered on each side by one of said outer layers, a magnet in said aperture of approximately the thickness of said middle layer, defining a magnetic axis in the plane of the disk, one of said layers comprising at least two sub-layers namely, an outer transparent sub layer, outward of a colored translucent sub layer, a light reflecting surface facing said colored translucent sub layer.

6. In the method of constructing a plurality of laminar magnet-bearing elements, the steps of:

providing a middle tape, creating a plurality of magnet apertures in said tape, said magnet apertures longitudinally spaced along said tape having, in plan, a longer dimension in the strip travel direction, each of said apertures being spaced from at least one edge of said tape, creating indexing cut-outs in said tape nearer to said at least one edge than said magnet apertures, after the creation of said apertures causing a first outer tape to adhere to one side of said middle tape, covering said apertures on said one side, thereafter placing magnets in said apertures, in an orientation relative to the longitudinal extension said magnets being selected and oriented to have their longitudinal axis approximately parallel to said tape and thickness approximately that of the middle tape, thereafter, causing a second outer tape to adhere to the outer side of said middle tape overlying said magnets and magnet aperture and leaving exposed on said other side, at least a portion of said cut-outs, including the step of forming one of said outer tapes from at least two sub layers prior to causing said outer tape to adhere to said middle tape, wherein said at least two sub layers comprise a translucent coloured sub layer and a super-imposed clear sub layer with a low linear thermal coefficient, where the said one of said outer-tapes is combined with said middle tape with the translucent sub-layer nearer said middle tape, and providing a light coloured reflecting surface facing said translucent sub layer.

7. In the method of constructing a plurality of laminar magnet-bearing elements, the steps of:

providing a middle tape, creating a plurality of magnet apertures in said tape, said magnet apertures longitudinally spaced along said tape having, in plan a longer dimension in the strip travel direction, each of said apertures being spaced at least one edge of said tape, creating indexing cut-outs in said tape nearer to said at least one edge than said magnet apertures, after the creation of said apertures causing a first outer tape to adhere to one side of said middle tape, covering said apertures on said one side, thereafter placing magnets in said apertures, said magnets being selected and oriented to have their longitudinal axis approximately parallel to said tape and thickness approximately that of the middle tape, thereafter, causing a second outer tape to adhere to the other side of said middle tape overlying said magnets and magnet aperture and leaving exposed on said other side, at least a portion of said cut-outs, including the steps of forming one of said outer tapes from at least two sub layers prior to causing said outer tape to adhere to said middle tape, wherein said at least two sub layers include a sub layer located adjacent the middle tape and having substantially a linear coefficient of thermal expansion differing from that the material of said other tape which is adjacent said middle layer, by less than $2\times10^{-5}$ in/in/°C.

8. In the method of constructing a plurality of laminar magnet-bearing elements, the steps of:

providing a middle tape, creating a plurality of magnet apertures in said tape, said magnet apertures longitudinally spaced along said tape having, in plan a longer dimension in the strip travel direction, each of said apertures being spaced from at least one edge of said tape, after the creation of said apertures causing a first outer tape to adhere to one side of said middle tape, covering said apertures on said one side, creating indexing cut-outs in said tape nearer to said at least one edge than said magnet apertures, thereafter placing magnets in: said apertures, in an orientation relative to the longitudinal extension said magnets being selected and oriented to have their longitudinal axis approximately parallel to said tape and thickness approximately that of the middle tape, thereafter, causing a second outer tape to adhere to the other side of said middle tape overlying said magnets and magnet aperture and leaving exposed on said other side, at least a portion of said cut-outs, including the step of forming one of said outer tapes from at least two sub layers prior to causing said outer tape to adhere to said middle tape, wherein said at least two sub layers include a sub layer of polyvinyl fluoride adjacent the middle tape and wherein the other outer tape includes a layer of polyvinyl fluoride adjacent the middle layer.

9. In the method of constructing a plurality of laminar magnet-bearing elements, the steps of:

providing a middle tape, creating a plurality of magnet apertures in said tape, said magnet apertures longitudinally spaced along said tape having, in plan a longer dimension in the strip travel direction, each of said apertures being spaced from at least one edge of said tape, creating indexing cut-outs in said tape nearer to said at least one edge than said magnet apertures, after the creation of said apertures causing a first outer tape to adhere to one side of said middle tape, covering said apertures on said one side, thereafter placing magnets in said apertures, in an orientation relative to the longitudinal extension said magnets being selected and oriented to have their longitudinal axis approximately parallel to said tape and thickness approximately that of the middle tape, thereafter, causing a second outer tape to adhere to the other side of said middle tape overlying said magnets and magnet aperture and leaving exposed on said other side, at least a portion of said cut-outs, including the step of forming one of said outer tapes from at least two sub layers prior to causing said last mentioned outer tape to adhere to said middle tape, wherein said at least two sub layers include a retroreflectant sub layer facing away from said middle tape and a transparent sub layer overlying said retroreflectant sub layer on the side remote from said middle tape.

* * * * *